Feb. 15, 1966

J. K. WILLIS 3,235,194

TAPE TRANSPORT SYSTEM

Filed March 8, 1963

JACK K. WILLIS
INVENTOR.

BY Robert G. Clay

ATTORNEY

United States Patent Office
3,235,194
Patented Feb. 15, 1966

3,235,194
TAPE TRANSPORT SYSTEM

Jack K. Willis, San Bruno, Calif., assignor to Ampex Corporation, Redwood City, Calif., a corporation of California Filed Mar. 8, 1963, Ser. No. 263,869
7 Claims. (Cl. 242—55.14)

This invention relates to transport systems for moving flexible materials, and more particularly to economical tape transport mechanisms which provide substantially constant tape speeds for recording and reproducing signals.

Most magnetic recorder systems that are used today drive a magnetic tape past recording and reproducing heads at a substantially constant selected speed. Most such systems also employ tape supply and take-up reels, because of the long lengths of tape which can be compactly stored and readily handled when in reel form. When a tape supply reel is driven at a constant speed, the tape speed varies in accordance with the diameter of the tape pack on the reel. Accordingly, the tape speed in the vicinity of the magnetic head is usually held constant at some selected rate by a constant speed drive capstan, and the reels are driven by other means which permit the reel rotational speeds to vary so as to compensate for the changing diameter of the tape on the reel. A take-up reel, for example, is often driven by a constant torque motor so that the motor tends to overrun the tape speed but slips so that the reel moves no faster than is permitted by the capstan. A wide variety of other power dissipative arrangements, and also gearing and belting mechanisms and slip clutches, are known.

These prior art mechanisms do not, however, confront in unified fashion the several problems that are involved in transporting a magnetic tape. It is highly desirable, for example, to use only a single power source for all driving functions in order to minimize size, cost and complexity. Proper recording interaction between the magnetic head assembly and the tape requires that the tape have a given and substantially constant tension along its length in the vicinity of the magnetic head assembly. Buckling effects can also occur between the supply reel and the magnetic head assembly if the supply reel is permitted to supply tape faster than the selected constant recording speed.

It is therefore an object of the present invention to provide an economical tape transport mechanism for magnetic recording purposes.

Another object of the present invention is to provide an improved magnetic tape transport mechanism utilizing a single power source and providing substantially constant tape speed.

A further object of the present invention is to provide an improved magnetic tape transport drive system which provides a substantially constant tape speed, and which also maintains substantially constant tape tension and provides proper unwinding and winding of the tape.

Another object of this invention is to provide an improved transport system for moving flexible materials at constant speed and tension.

These and other objects of the present invention are achieved by a transport system which directly drives the material at two separated points on its surface through a differential coupling system from a single power source. In a magnetic tape transport, the tape supply and take-up reels are directly driven at the tape pack peripheries. In one specific example of a system in accordance with the invention, a driving member is coupled to rotate the input of a differential mechanism, the output mechanisms of which are coupled to the tape packs on the supply and take-up reels respectively. The couplings from the output sides of the differentials are made through movable drive wheels that engage the peripheries of the tape packs, which are found on the separate reels. The supply reel is frictionally restrained, resulting in a counter-torque at this side of the differential. The differential mechanism acts to overcome this counter-torque by supplying an equal and opposite torque to the driving or take-up side, thus effectively maintaining the tape under a specific amount of tension as it is moved between the supply and take-up reels. The output mechanisms of the differential move at equal speeds, and because each drive coupling is made directly to the tape pack periphery, the tape leaves the supply reel at the same rate that it is wound on the take-up reel. Freedom from tape bunching at either reel is assured by either employing sufficient tension in the tape or by maintaining the friction along the tape paths at the take-up side of the magnetic head assembly greater than that along the tape path at the supply side.

With this mechanism, different tape speeds may be selected simply by different gearing or belting ratios in the couplings from a constant speed motor to the input side of the differential. The mechanism may be employed with different configurations of tape transports, and a wide variety of differential mechanisms may also be used.

A better understanding of the invention may be had by reference to the following description, taken in conjunction with the accompanying drawings, in which.

Figure 1:
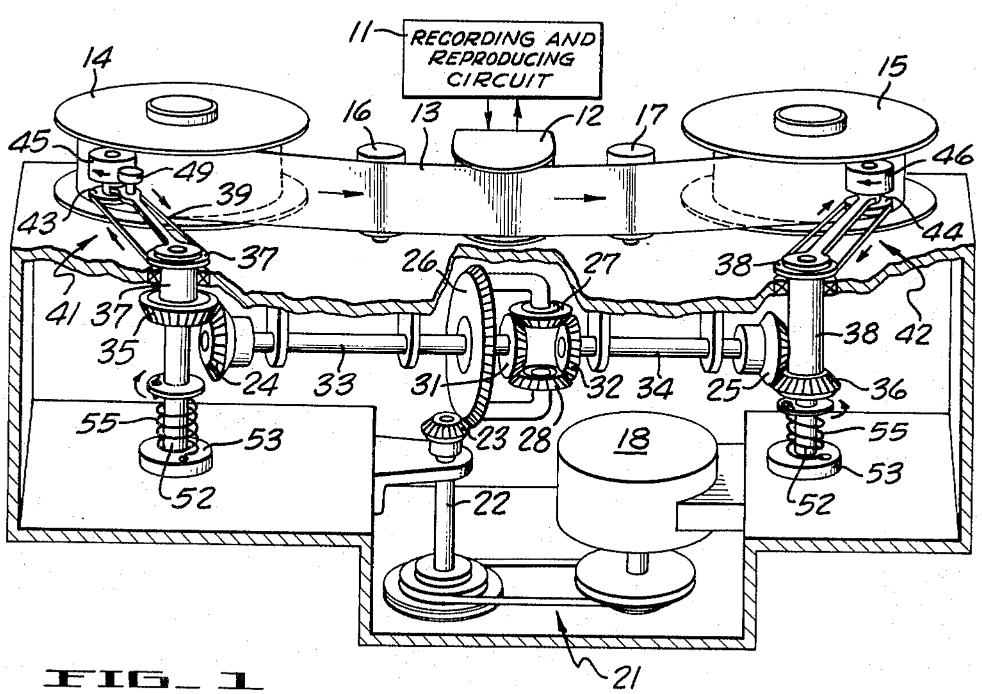
FIGURE 1 is a perspective representation, partially broken away, of a magnetic tape transport mechanism in accordance with the invention.
Figure 2:
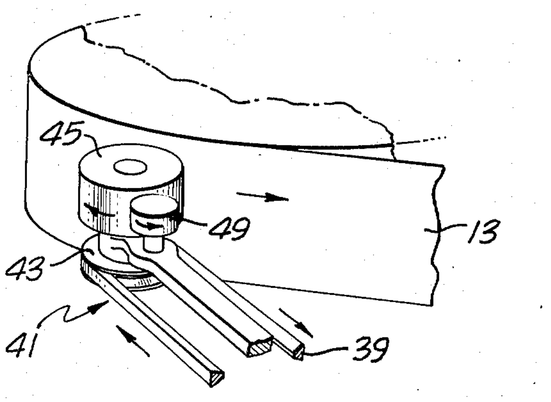
FIGURE 2 is a fragmentary perspective view of a portion of the arrangement of FIGURE 1.

Referring now to FIGURES 1 and 2, there is shown the principal driving elements of a magnetic tape transport system in accordance with the invention. The system shown has been greatly simplified for clarity, and a number of other conventional components have not been illustrated because any of several known expedients may be employed. The cabinet 10 for the tape transport system is not shown in detail, and the driving elements have been greatly enlarged in size in order to present them more clearly. The associated electronics are referred to generally as the recording and reproducing circuits 11 and are coupled to a magnetic head assembly 12 which is in operative association with the magnetic tape 13. The tape 13 itself is moved past the magnetic head assembly 12 between supply and take-up reels, 14 and 15 respectively, which are rotatably mounted on the front panel of the cabinet 10, and which are driven by means provided in accordance with the invention. Idler guide rollers 16 and 17 in engagement with the tape 13 maintain the tape in the desired path between the supply and take-up reels.

Drive systems in accordance with the invention operate directly against the periphery of the tape bodies on both the supply and take-up reels, 14 and 15 respectively. The overall mechanism is best illustrated in the perspective view of FIGURE 1, and the actual member in engagement with the tape body is shown in best detail in FIGURE 2. The primary source of power is a drive motor 18, such as a common synchronous motor driven at a constant rate of speed by alternating current from a power supply. It should also be recognized that a variable speed D.C. motor may be employed, and that a speed control mechanism operating in conventional fashion from a clock track or other timing indicia may also be utilized. With a constant speed motor, however, variable drive speeds are achieved through the use of a variable gear mechanism, or as shown, a belt and pulley arrangement 21 which provides different speed ratios.

The output shaft 22 of the driven pulleys is coupled to drive the input gear 23 of a differential mechanism having a pair of output gears 24 and 25. In the differential mechanism shown, a sun gear 26 is driven directly from the input gear 23, and a pair of rotatable planetary gears 27 and 28 provide the input rotation to a pair of beveled gears 31 and 32 which are coupled through the output shafts to the output gears 24 and 25 respectively, for the differential. As the planetary gears 27 and 28 are rotated with the sun gear 26, the output shafts 33 and 34 are rotated at equal rates. Each of the output shafts 33 and 34 is coupled to drive a different one of the tape bodies, although similar arrangements are used. Thus, another beveled gear arrangement 35 (or 36) coupled to the respective output shaft 33 (or 34) rotates a drive pulley 37 or 38 that operates through a belt 39 and forms part of an extendable arm mechanism 41 (or 42), at the free end of which is maintained a driven pulley 43 (or 44) and a slightly resilient driving wheel 45 (or 46). This mechanism is more fully shown in FIGURE 2, and it may be seen that the driven pulley 43 is held out of engagement with the tape 13, while the periphery of the resilient driving wheel 45 engages the tape body.

Once a speed of tape movement is selected by a selection of proper gearing ratio, or by other selection of the input rotation, the system operates to advance the tape 13 at the selected speed and with a controlled amount of tension. To this end, the resilient driving wheel 45, which is in engagement with the tape body on the supply reel 14, is held under a light frictional restraint by an engaging rotatable member 49 which is coupled to the associated pivot arm 41. This member 49 may be made adjustable as to the frictional restraint it exerts.

Figure 3:
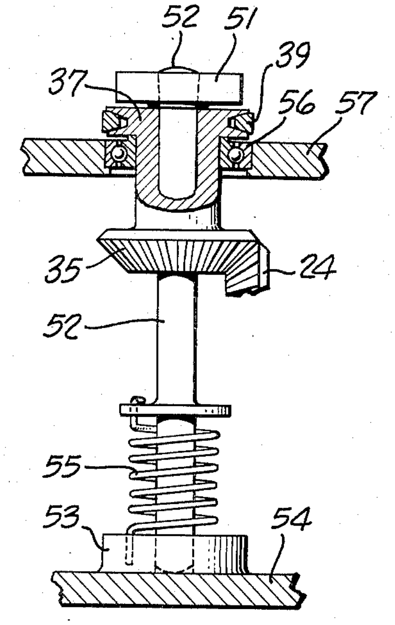
FIGURE 3 is an elevation of a portion of the arrangement of FIGURE 1.

As shown in FIGURE 3, the pivot portion 51 of the arm 41 is mounted integrally on a shaft 52, which turns in a bearing 53 mounted on the bottom plate 54 of the chassis. A spring 55 is coupled between the shaft 52 and bearing 53 to urge the arm 41 in a pivoting direction toward the reel 14 to cause pressure bearing of the roller 45 against the tape or reel 14. The pulley 37, to which the gear 35 is attached, rotates freely around the shaft 52, and is supported in a ball bearing 56 mounted in the top plate 57 of the chassis. A similar arrangement is provided for the arm 42.

In the operation of the system, the symmetrically arranged driving links operate to drive the tape bodies in the proper directions and at the same linear tape speed, even though the rotational speeds of the two reels 14 and 15 vary continually during operation. Thus, despite the radius of the outer periphery of the tape body on the supply reel 14, the tape 13 leaves the reel 14 and is supplied to the take-up reel 15 at the same constant rate.

Additionally, the differential driving mechanism is utilized to maintain a constant tension on the tape 13 in the vicinity of the magnetic head assembly 12 at all times. The frictional rotating wheel 49 at the supply reel 14 subjects the resilient driving wheel 45 to a constant drag. This results in imbalance between the torques exerted at the two tape bodies and the desired tension relationship along the length of the tape 13.

It must first be understood, however, that the peripheral velocities of the two tape bodies, and therefore the velocity of the tape 13, remains essentially constant at the selected velocity value. The differential mechanism tends to rotate the two resilient driving wheels 45 and 46 at like regular velocities. As in the usual differential mechanism, if one of these driving wheels 45 or 46 is restrained or limited in its rate of angular movement, at least some of the angular movement is imparted to the other side of the differential, in accordance with the usual rule that the input angular velocity of the differential is equal to the sums of the two output angular velocities divided by two. The two sets of output members of the differential are, however, effectively linked together by the tape 13 which they drive in common.

Under these circumstances, the counter torque to the rotation of the driving wheel 45 at the supply reel 14 seeks to slow down the coupled output gear 24 of the differential, and accordingly, the opposite output gear 25 of the differential seeks to speed up, although it cannot so long as there is no slippage between the driving wheels and reels. Assuming that the driving wheels 45 and 46 at the supply and take-up reels, 14 and 15 respectively, have equal radii, the result is a tendency of the driving wheel 45 at the supply side to slow down below the nominal value and a tendency of the driving wheel 46 at the take-up side to speed up above the nominal value. Because both driving wheels 45 and 46 operate directly on the tape and must have a like angular velocity (for the given wheel radii, and so long as there is no slippage between the driving wheels and reels), the actual effect is the introduction of a counter-torque at the driving wheel 46 on the take-up side which is equal and opposite to that introduced at the supply side. The result therefore is that a controlled tension is maintained along the length of tape 13 as it passes between the supply and take-up reels.

There is, of course, tension introduced along the tape from the frictional contact with the guide rollers 16 and 17, magnetic head assembly 12 and any other elements which are used in the system. This additional tension seeks to over balance the torque at the take-up side, effectively increasing the counter-torque at the take-up drive wheel 46. The differential mechanism, however, concurrently increases the impelling torque at the supply reel 14, thus tending to restore the selected tension along the tape length.

This system therefore operates the tape reels 14 and 15 in a simple freely rotating manner, although they are positively controlled by the driving wheels 45 and 46 which engage the peripheries of the tape bodies. Once the tape is wound on the reel hub, however, it is not held under a positive tension because of any action of the reel shaft, as is the case with prior art systems. Accordingly, devices in accordance with the invention further provide for an orderly winding of the tape 13 on the tape body. It is preferred to maintain the tape tension sufficient between the tape supply and take-up reels, 14 and 15, to prevent a tension-reversal and subsequent tape bunching after the tape 13 has passed the driving wheel 45 at the take-up side. It is also feasible, however, to utilize the friction which exists between the successive layers of tape. If this relationship is to be used alone, the friction between the driving wheel 45 and the tape 13 at the take-up side must be lower than that existing between the layers of the tape body on reel 14.

The differential mechanism, and the mechanisms for driving the peripheries of the tape packs may be varied in a number of ways, as will be understood by those skilled in the art. The driving wheels 45 or 46 may, for example, be mounted on the opposite side of the tape reels from the magnetic head assembly 12. A number of differential driving mechanisms, including differentially movable stator and rotor assemblies of an electrical motor, and various well-known mechanical expedients, may be employed, as well as any of a variety of belt, gear, or flexible drive couplings.

This invention has been particularly described with relation to magnetic tape transports since the advantages realized thereby are most immediately concerned with the field of magnetic recording and reproducing. However, this invention has wide application to a variety of situations in which a constant speed and tension is desired in moving a material between two points. For example, in certain paper manufacturing and printing operations such results are highly desirable in moving paper strips between rolls.

In other cases, as with more inflexible materials which cannot be wound in packs on reels or rolls, the material may be transported in this manner by friction rollers which bear on the material surface at separated points. Each of the rollers may be similar to the conventional capstan and pinch roller arrangements and will be driven by the differential coupling. The two rollers need not operate at exactly the same speed if different speeds are necessary, as where the material is permanently lengthened between the two points as in a rolling mill or the like. Only a slight change in roller size or gearing ratio need be made to compensate for the greater speed at one of the points. It will therefore be appreciated that the invention is not confined to the illustrated modifications and variations, but includes all alternative forms falling within the scope of the appended claims.

What is claimed is:

1. A magnetic tape drive system for maintaining constant tension on a magnetic tape while driving the tape at constant speed, comprising:
   tape supply and take-up reels adapted to have bodies of tape wound thereon;
   a pair of rotatable drive means, each separately engaging the outer periphery of a tape body on the respective supply and take-up reels;
   rotatable power means;
   differential means coupling the rotatable power means to each of the drive means; and
   means coupled to one of the rotatable drive means for exerting a counter torque thereon.

2. A magnetic tape drive system for maintaining constant tension on a magnetic tape while driving the tape at constant speed, comprising:
   tape supply and take-up reels adapted to have bodies of tape wound thereon;
   means providing a mechanical rotation;
   means including a common differential mechanism for engaging and driving the outer peripheries of said tape bodies concurrently from the rotation means; and
   means coupled to the driving means for introducing a selected counter-torque to the supply reel.

3. A magnetic tape transport mechanism including the combination of:
   rotatable tape supply reel means;
   a rotatable tape take-up reel means;
   rotary drive means;
   a differential coupling mechanism having an input and first and second outputs, the input being coupled to the rotary drive means;
   first mechanical coupling means engaging the outer periphery of the tape on the supply reel means and coupled to the first output of the differential coupling mechanism;
   second mechanical coupling means engaging the outer periphery of the tape on the take-up reel means and coupled to the second output of the differential coupling mechanism; and
   means restraining the rotation of the supply reel means.

4. A magnetic tape transport mechanism including the combination of:
   rotatable supply reel means having a tape pack thereon;

rotatable take-up reel means having a tape pack thereon;
   magnetic transducer means disposed intermediate the supply reel means and the take-up reel means along the tape path;
   rotary drive means;
   a differential coupling mechanism having an input and first and second outputs, the input being coupled to the rotary drive means;
   first mechanical coupling means engaging the tape pack on the supply reel means and coupled to the first output of the differential coupling mechanism;
   second mechanical coupling means engaging the tape pack on the take-up reel means and coupled to the second output of the differential coupling mechanism;
   means restraining the rotation of the supply reel means to introduce a counter-torque at the second mechanical coupling means, whereby a tape tension of a selected magnitude is introduced; and
   means in the coupling between the rotary drive means and the differential coupling mechanism for providing a selectable speed relationship between the angular rotation of the rotary drive means and the angular rotation of the input to the differential coupling mechanism.

5. The invention as set forth in claim 4 above, wherein:
   the first and second mechanical coupling means each include an extendable arm mechanism having a resilient driving wheel;
   a belt and pulley mechanism for rotating the driving wheel; and
   means for mechanically biasing the belt and pulley mechanism to urge the driving wheel into engagement with the tape pack.

6. The invention as set forth in claim 4 above, wherein said restraining means includes means for maintaining the tape tension between the first and second mechanical coupling means at a value sufficient to prevent a tension reversal at the take-up means.

7. The invention as set forth in claim 5 above, where said biasing means includes means for maintaining the friction between the second mechanical coupling means and the tape at a value less than the friction between successive layers of tape on the tape pack at the rotatable take-up reel means.

References Cited by the Examiner

UNITED STATES PATENTS

| | | | |
|---|---|---|---|
| 2,012,208 | 8/1935 | Wildy | 242—75.5 X |
| 2,457,699 | 12/1948 | Marsen | 242—55.14 X |
| 2,542,917 | 2/1951 | Fischer et al. | 242—54.1 |
| 2,632,060 | 5/1953 | Foote et al. | 242—54.1 X |
| 3,119,537 | 1/1964 | Smits | 242—75.5 X |

FOREIGN PATENTS

| | | |
|---|---|---|
| 424,924 | 3/1935 | Great Britain. |

MERVIN STEIN, *Primary Examiner.*